(12) United States Patent  
Strein et al.

(10) Patent No.: US 8,384,827 B2
(45) Date of Patent: *Feb. 26, 2013

(54) SYSTEM AND METHOD FOR IN-BAND A/V TIMING MEASUREMENT OF SERIAL DIGITAL VIDEO SIGNALS

(75) Inventors: Michael J. Strein, Oakdale, NY (US); Efthimis Stefanidis, Douglaston, NY (US); James L. Jackson, Cresskill, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 12/792,617

(22) Filed: Jun. 2, 2010

(65) Prior Publication Data

US 2011/0298979 A1 Dec. 8, 2011

(51) Int. Cl.
*H04N 9/475* (2006.01)
(52) U.S. Cl. .................................. 348/515; 348/512
(58) Field of Classification Search .............. 348/512, 348/515, 500, 516, 518, 722, 513; H04N 5/04, H04N 9/475, 5/222, 9/44
See application file for complete search history.

(56) References Cited

U.S. PATENT DOCUMENTS

| 6,275,537 | B1 | 8/2001 | Lee |
| 6,278,739 | B2 * | 8/2001 | Enomoto et al. ............. 348/722 |
| 6,359,656 | B1 | 3/2002 | Huckins |
| 7,471,337 | B2 | 12/2008 | Wells et al. |
| 7,764,713 | B2 | 7/2010 | Abraham et al. |
| 7,907,211 | B2 | 3/2011 | Oostveen et al. |
| 2008/0074543 | A1 | 3/2008 | Takada et al. |
| 2011/0261257 | A1 | 10/2011 | Terry et al. |

\* cited by examiner

*Primary Examiner* — Sherrie Hsia
(74) *Attorney, Agent, or Firm* — Patterson & Sheridan, LLP

(57) ABSTRACT

A system and method for characterizing the relative offset in time between audio and video signals and enables the receiver of the audio and video signals to resynchronize the audio and video signals. Signal characterization data is dynamically captured and encoded into frames of video and audio data that is output by a television origination facility. The signal characterization data is extracted by the receiver and signal characterization data is captured for the received frames. The extracted signal characterization data is compared with the captured signal characterization data to compute the relative offset in time between the video and one or more audio signals for a frame. The receiver may then resynchronize the video and audio signals using the computed relative offset.

18 Claims, 7 Drawing Sheets

SYSTEM AND METHOD FOR IN-BAND A/V TIMING MEASUREMENT OF SERIAL DIGITAL VIDEO SIGNALS

BACKGROUND

1. Field of the Invention

The present invention relates to the field of audio and video signaling and, in particular, to a system and method for in-band A/V timing measurement of serial digital video signals.

2. Description of the Related Art

Viewers can easily detect when the audio corresponding to a video images is not synchronized. Even a relative offset between the video and audio signals of only one or two frames can result in a broadcast that does not appear to be lip synched. The lack of synchronization may be the result of delays introduced to either or both the video and audio signals from the point of origin until when the signals are output from a television facility.

In order to enable resynchronization of the video and audio signals by a receiver, some conventional systems characterize the relative offset in time from the point of origin of the audio and video signals to the point when the audio and video signals are output from a television facility. Conventional characterization techniques measure the relative offset through the television facility using specific test patterns when the television facility is out of service. Once the relative offset between the video and audio signals is determined, the equipment within the television facility may be adjusted to eliminate or reduce the relative offset to an acceptable level. Other techniques that do not require the television facility to be out of service in order to characterize the relative offset require expensive equipment and bi-directional communication between the television facility and receivers in order to resynchronize the video and audio signals at each receiver.

As the foregoing illustrates, there is a need in the art for an improved technique for characterizing the relative offset in time between audio and video signals and providing the offset measurements to the receiver of the audio and video signals.

SUMMARY

Embodiments of the invention include a system for characterizing the relative offset in time between audio and video signals that are used by a receiver of the audio and video signals to measure the relative offsets. The receiver may then resynchronize the video and audio signals using the measured relative offsets. The characterization is performed using in-band signaling so that the characterization data is carried with the video and audio signals for each frame. The characterization data includes a checksum for a scanline of the video signal that is captured and encoded in the vertical ancillary (VANC) space of a high definition television (HDTV) signal. The characterization data also includes a checksum for each pair of audio channels that is captured and encoded in the VANC space. The television facility transmits the video and audio signals along with the checksums encoded in the VANC space for each frame. The receiver extracts the encoded checksums from the VANC space and also captures checksums for each scanline using the video and audio signals. The extracted checksums are compared with the captured checksums to determine the relative offset between the video and audio signals. The receiver may then use the relative offsets to resynchronize the video and audio signals for output.

One embodiment of the invention provides a computer-implemented method for characterizing a relative offset in time between audio and video signals. The method includes receiving, from a television facility, a sequence of frames including video and audio signals as well as characterization data that is transmitted using in-band signals. The in-band characterization data is extracted from the sequence of frames and other characterization data for the sequence of frames is captured based on the video and audio signals to produce captured characterization data. The captured characterization data is compared with the extracted in-band characterization data to determine the relative offset in time between the audio and video signals for the sequence of frames.

One embodiment of the invention provides a computer-implemented method for characterizing a relative offset in time between audio and video signals. The method includes generating, by the television facility, characterization data for synchronized audio and video signals of each frame in a sequence of frames. The characterization data for the synchronized audio and video signals of each frame in the sequence of frames is inserted into a vertical ancillary (VANC) space of a signal that includes video and audio signals for the frame. The signal is transmitted to a receiver that is configured to extract the characterization data from the VANC space of the signal, extract the video and audio signals from the signal, and align the extracted video and audio signals based on the extracted characterization data to produce the synchronized audio and video signals for each frame in the sequence of frames.

One advantage of the techniques described herein is that the television facility does not need to be out of service during the characterization of the relative offset in time between the video and audio signals. The characterization occurs dynamically and the measurement data needed to determine the relative offsets is provided to the receiver with the video and audio signals by using in-band signaling. Yet another advantage includes simpler and less expensive hardware, since the receiver only needs store a sequence of checksums extracted from the received signals and perform comparison operations with captured checksums to calculate the relative offsets.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

The system and method for characterizing relative offsets in time between video and audio signals and resynchronizing the video and audio signals can be implemented in any digital television delivery system that transmits a high-definition (HD) or other standard format television signal. The structure of standard format television signals can be used to transmit additional information, sometimes referred to ancillary data. In an embodiment, characterization data is encoded as ancillary data along with the digitally transmitted audio and video signals. The characterization data is used by a receiver to resynchronize the video and audio signals.

The system and method for characterizing relative offsets in time between video and audio signals and resynchronizing the video and audio signals can be implemented in hardware, software, or a combination of hardware and software. When implemented in hardware, the system and method for characterizing relative offsets in time between video and audio signals and resynchronizing the video and audio signals can be implemented using specialized hardware elements and logic. When the system and method for characterizing relative offsets in time between video and audio signals and resynchronizing the video and audio signals is implemented in software, the software can be used to control the various components in a system and network associated with the program. The software can be stored in a memory and executed by a suitable instruction execution system (microprocessor). The hardware implementation of the system and method for characterizing relative offsets in time between video and audio signals and resynchronizing the video and audio signals can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method of characterizing relative offsets in time between video and audio signals and resynchronizing the video and audio signals comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 1:
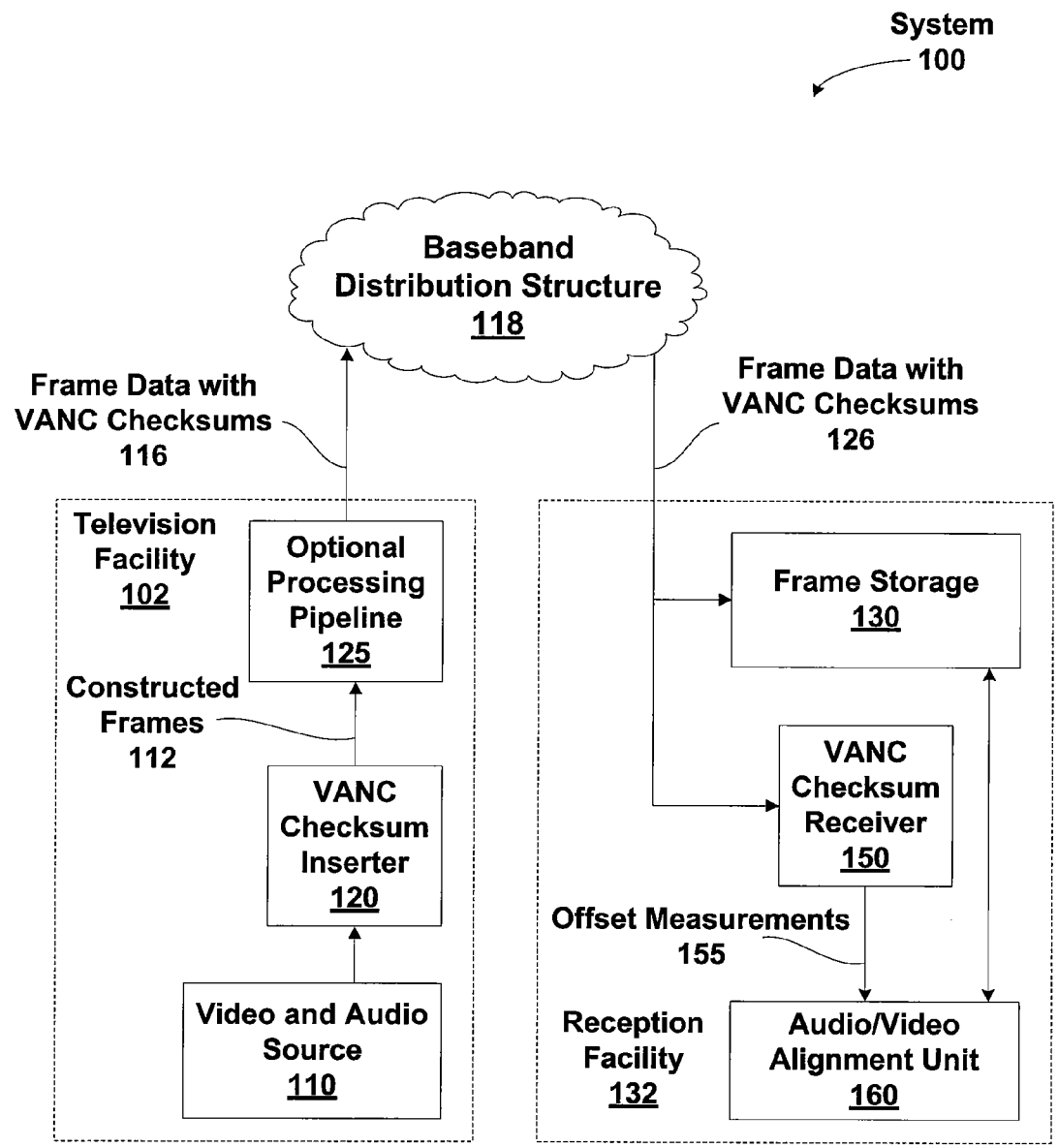
FIG. 1 is a block diagram of a system configured to implement one or more aspects of the present invention.

FIG. 1 is a block diagram illustrating an example of a system 100 that can implement the system for characterizing relative offsets in time between video and audio signals and resynchronizing the video and audio signals. The system 100 includes a television origination facility 102, a baseband distribution structure 118, and a reception facility 132. The television origination facility 102 may be a television studio and the reception facility 132 may be a post-production facility. The system 100 may be positioned within a larger system at a point of passthru or aggregation. The television origination facility 102 and the reception facility 132 may be located within close proximity to each other, e.g., within the same facility, or at different geographical locations. Details of the baseband distribution structure 118, which can be capable of bi-directional communication, are not described herein as they are known to those skilled in the art. In one embodiment, the television origination facility 102 can be, for example, a cable television (CATV) broadcast facility that transmits the frame data with VANC checksums 116 over a cable, or other wired distribution system provided by the baseband distribution structure 118. Further, the frame data with VANC checksums 116 may be transmitted from the television origination facility 102 to the reception facility 132 through the baseband distribution structure 118 using information embedded in a high-definition television (HDTV) or other standard broadcast signal. The reception facility 132 may output signals to satellite or other types of transmission systems.

The television origination facility 102 includes a video and audio source 110 that stores video and audio data that is output to a VANC checksum inserter 120. In an embodiment, the VANC checksum inserter 120 is a communication element that can insert data into the vertical ancillary (VANC) space of a HDTV or other standard format video signal. The insertion of information into the vertical ancillary space of an HDTV signal is described in SMPTE (The Society Of Motion Picture And Television Engineers) standard 334M-200 entitled "Vertical Ancillary Data Mapping for Bit-Serial Interface," which is incorporated herein by reference.

In accordance with an embodiment of the system for characterizing relative offsets in time between video and audio signals and resynchronizing the video and audio signals, the VANC checksum inserter 120 dynamically captures checksums for a scanline of video data and the corresponding audio data received from the video and audio source 110. The checksums are typically computed by another unit within the television origination facility 102 (not shown) and are used but the reception facility 132 to determine whether or not the data is received without errors. The captured checksums are encoded in the VANC for the frame that includes the video and audio data to produce a constructed frame. Constructed frames 112 are output by the VANC checksum inserter 120 to an optional processing pipeline 125 that may be configured to perform additional processing of the video and audio signals. The optional processing pipeline 125 outputs the frame data with VANC checksums 116 to the baseband distribution structure 118. The baseband distribution structure 118 transmits the frame data with VANC checksums 116 to the reception facility 132.

The reception facility 132 receives the frame data with VANC checksums 126 that includes the checksums that are encoded in the VANC and video and audio data. The video and audio data for a sequence of frames are stored in frame storage 130. The audio data may be stored separately from the video data in the frame storage 130. A VANC checksum receiver 150 receives the frame data with VANC checksums 126 and extracts the video and audio checksums that are encoded in the VANC. The VANC checksum receiver 150 stores the extracted video and audio checksums and captures checksums for the same scanline of each frame using the video and audio data that is received as part of the frame data with VANC checksums 126. The captured checksums are compared with the extracted checksums to measure any relative offsets between the video data and one or more of the audio channel pairs represented by the audio data. Each pair of audio channels may have a different offset in time relative to the video data, so each pair of audio channels may be separately synchronized to the video data. The different relative offsets for the audio data are output to an audio/video alignment unit 160 as offset measurements 155. The audio/video alignment unit 160 synchronizes the video data and the audio data based on the offset measurements 155 to produce synchronized video and audio data.

Figure 2A:
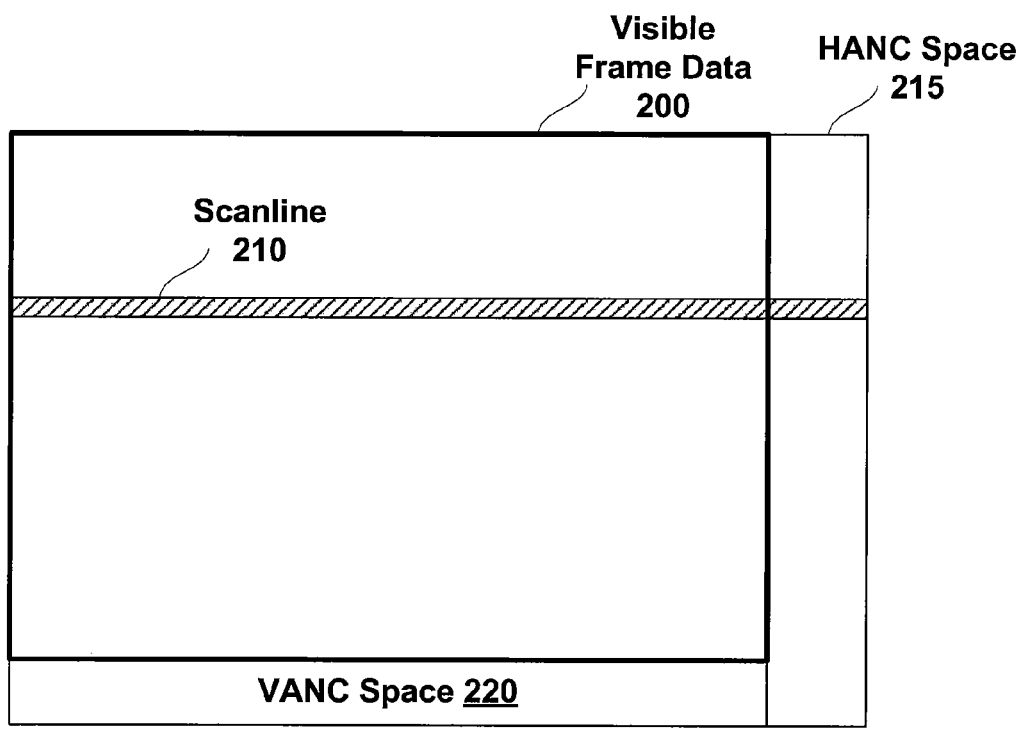
FIG. 2A is a conceptual diagram illustrating a frame including a line of video data and corresponding audio data as well as the VANC space, according to one embodiment of the invention.

FIG. 2A is a conceptual diagram illustrating a frame including a scanline 210 of video data as well as corresponding audio data and the VANC space 220, according to one embodiment of the invention. The video data is stored in a visible frame data 200 portion of the frame. When one type of HDTV format is used, a frame includes 750 scanlines with the visible frame data 200 occupying 720 scanlines and the VANC space 220 occupying 30 scanlines. The horizontal ancillary (HANC) space 215 is also included in the frame and stores audio data for each scanline of the frame. Multiple channels of audio data may be stored in the HANC space 215 with each channel represented by a pair of audio signals.

Figure 2B:
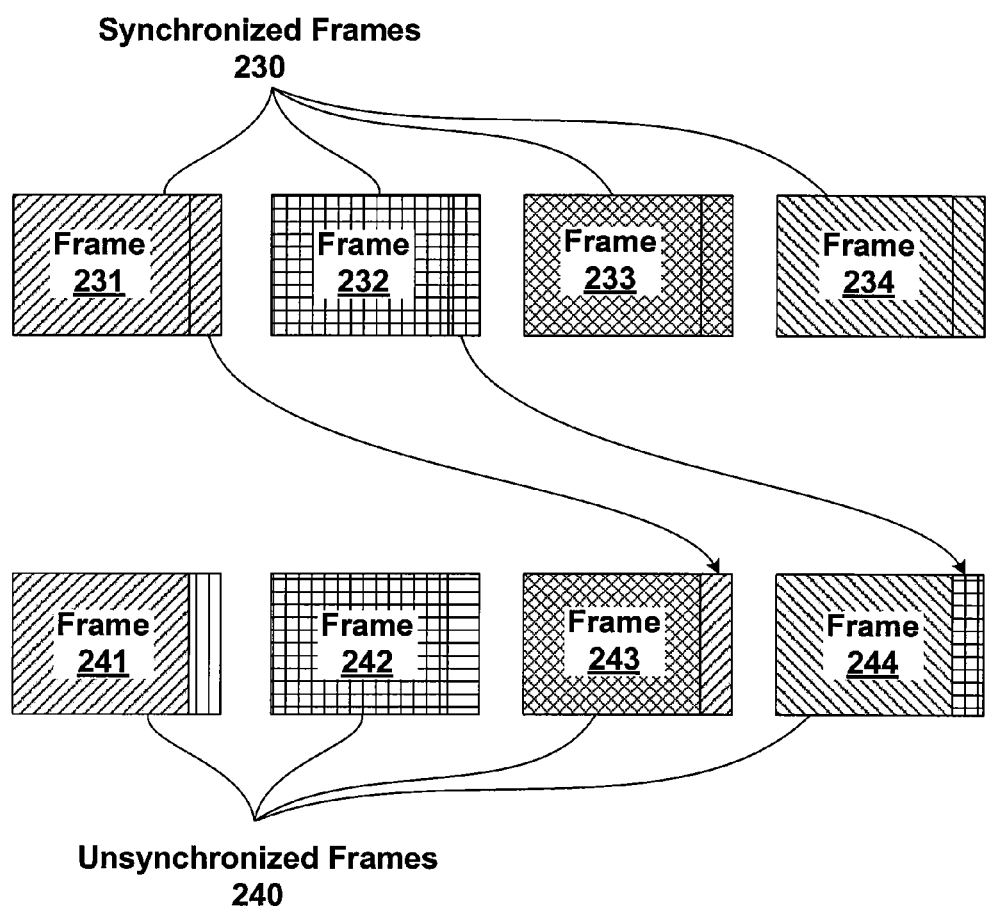
FIG. 2B is a conceptual diagram illustrating a sequence of synchronized frames including video data and corresponding audio data as well as a sequence of unsynchronized frames including video data and corresponding audio data, according to one embodiment of the invention.

FIG. 2B is a conceptual diagram illustrating a sequence of synchronized frames of video data and corresponding audio data 230 as well as a sequence of unsynchronized frames of video data and corresponding audio data 240, according to one embodiment of the invention. The video data and corresponding audio data for each of frames 231, 232, 233, and 234 is shown in the same pattern, with the audio data residing in the HANC space and the video data residing in the visible frame space. The audio data is delayed by the television origination facility 102 and appears offset by two frames in frames 241, 242, 243, and 244 of the unsynchronized frames of video and corresponding audio data 240. More specifically, the audio data from frame 231 arrives at the reception facility 132 in frame 243 along with the video data from frame 233. Similarly, the audio data from frame 232 arrives at the reception facility 132 in frame 244 along with the video data from frame 234. In order to properly synchronize the audio and video data, the reception facility 132 either delays the video data by two frames to appear in the frame with the corresponding audio data or the reception facility 132 advances the audio data by two frames to be output with the frame containing the corresponding video data. In another example, the audio data may be delayed or advanced by one or more scanlines within a frame relative to the video data. In order to properly synchronize the audio and video data, the reception facility 132 either delays the video data by the same number of scanlines or delays the audio data by the same number of scanlines to align the corresponding video and audio data.

Figure 3A:
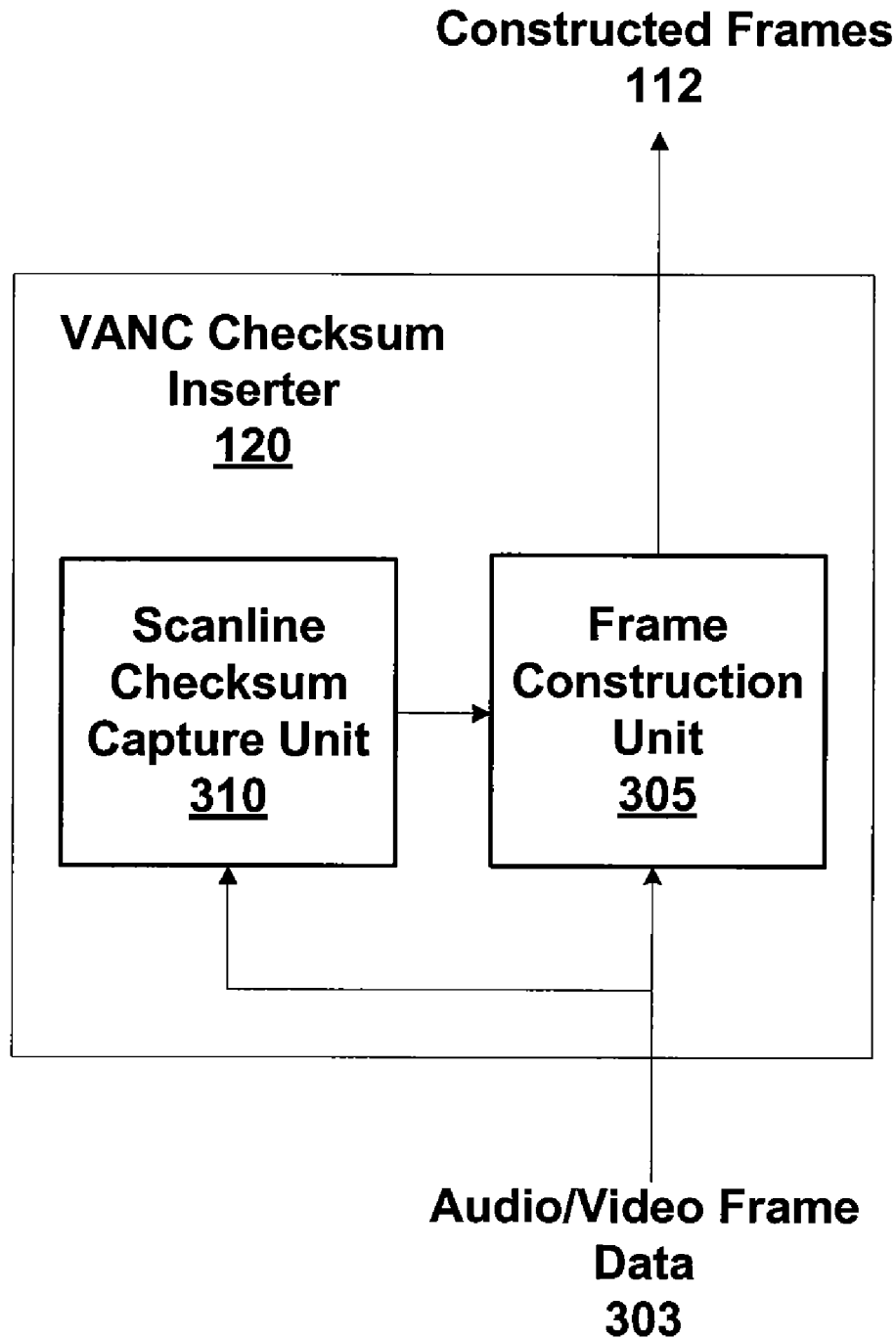
FIG. 3A is a block diagram illustrating the VANC data inserter of FIG. 1, according to one embodiment of the invention.

FIG. 3A is a block diagram illustrating the VANC checksum inserter 120 of FIG. 1, according to one embodiment of the invention. The VANC checksum inserter 120 includes a scanline checksum capture unit 310 and a frame construction unit 305. The scanline checksum capture unit 310 may be configured to receive audio/video frame data 303 and capture a checksum for the video data in a particular scanline 210 for several frames in a sequence of frames. The scanline checksum capture unit 310 may also be configured to capture a checksum for each pair of audio signals corresponding to the same scanline 210 for several frames in a sequence of frames. In some embodiments, checksums are captured for each scanline of a frame. The captured checksums are then encoded in the VANC space 220 for each frame by the frame construction unit 305 to produce constructed frames that include the video and audio signals and the video and audio characterization data, e.g., checksums, for each frame.

Since the checksums are captured at a point where the video and audio data is synchronized, the checksums can function as characterization data that are used by the reception facility 132 to resynchronize the video and audio data. However, if the video and/or audio data is modified in a manner that would change the value of the checksum after the checksum is encoded in the VANC space, the checksums cannot be used as characterization data. Examples of modifications that change the checksum for audio include increasing or decreasing the volume level of an audio channel.

In one embodiment, the frame construction unit 305 inserts the captured checksums into the VANC space 220 using the data ID (DID) 0x52 and the secondary data ID (SID) 0x01 as per SMPTE 272M-2004 and 291M-2006 guidelines for the insertion of user-defined data into an HDTV signal. Any scanline of the visible frame data 200 of the frames may be used to capture the checksums for the video and audio data. In order to compensate for any delay introduced between the video and audio signals by the television origination facility 102 and properly synchronize the video and audio data at the reception facility, the video and audio signals should not be constant, e.g., a static test pattern. When the checksums for each frame are identical, any relative offset introduced by the television origination facility 102 cannot be determined when the checksums in the VANC space are extracted and compared with checksums captured from the received video and audio signals. Since a lack of synchronization between constant signals is not noticed by a viewer, it is not necessary to synchronize constant signals.

Figure 3B:
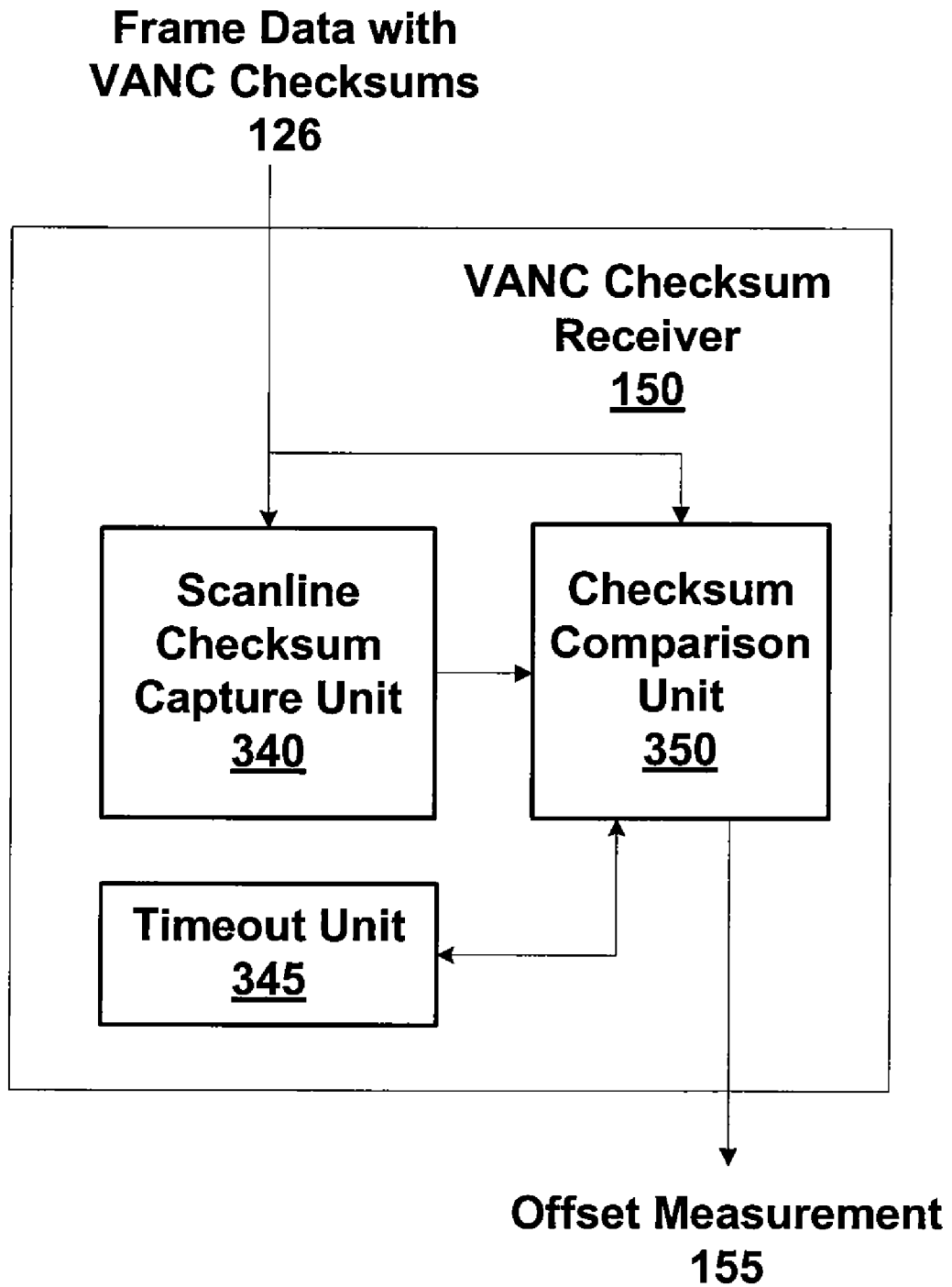
FIG. 3B is a block diagram illustrating the network VANC receiver of FIG. 1, according to one embodiment of the invention.

FIG. 3B is a block diagram illustrating the VANC checksum receiver 150 of FIG. 1, according to one embodiment of the invention. The VANC checksum receiver 150 includes a scanline checksum capture unit 340, a checksum comparison unit 350, and a timeout unit 345. The scanline checksum capture unit 340 receives the frame data with VANC checksums 126 for frames of data in a sequence and captures checksums for the video data in a particular scanline 210 for several frames in a sequence of frames. The scanline checksum capture unit 340 is also configured to capture a checksum for each pair of audio signals corresponding to the same scanline 210 for several frames in a sequence of frames. In some embodiments, checksums are captured for each scanline of a frame. Importantly, in order to detect a lack of synchronization at a scanline level, the scanline checksum capture unit 340 should capture checksums for each scanline of a frame. The checksum comparison unit 350 receives the frame data with VANC checksums 126 and extracts the checksums encoded in the VANC space. The captured checksums for each scanline of each frame are then compared with the extracted checksums for the audio and video signals of each frame by the checksum comparison unit 350.

The checksum comparison unit 350 compares the captured checksums with extracted checksums for scanlines and frames that occur earlier and later in the sequence of frames since the audio signal for one or more channels may be delayed or advanced in time relative to the video signal. The checksum comparison unit 350 determines an offset measurement for each one of the audio channel pairs associated with a checksum and outputs the offset measurements for each frame as offset measurement 155. The offset measurement is the relative offset in time between the audio and video signals for the sequence of frames. The timeout unit 345 tracks the number of clock cycles or frames for which a match is not found and indicates that the offset measurement cannot be determined when the number of frames or clock cycles exceeds a predetermined value. In some embodiments the predetermined value is the number of frames for which extracted checksums are buffered for the comparison operation.

Figure 4A:
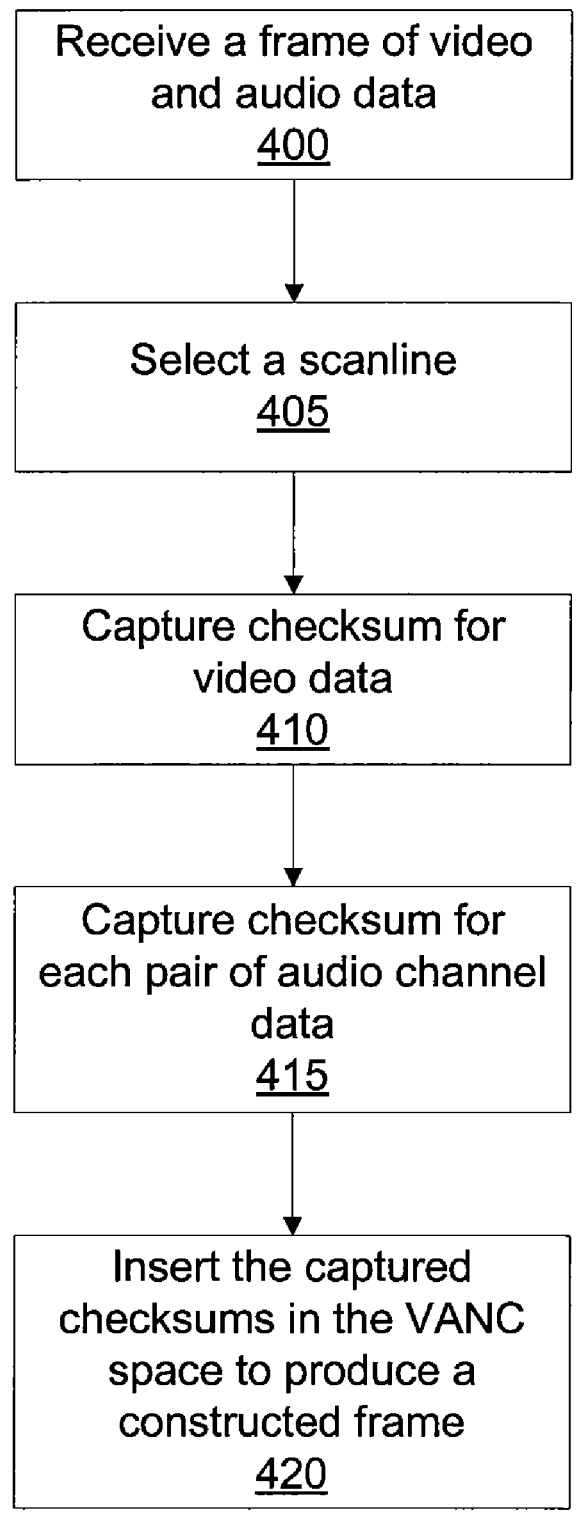
FIG. 4A is a flowchart of method steps describing the operation of the VANC data inserter of FIG. 3A, according to one embodiment of the invention.

FIG. 4A is a flowchart of method steps describing the operation of the VANC checksum inserter 120 of FIG. 3A, according to one embodiment of the invention. The VANC checksum inserter 120 generates characterization data that is transmitted by the television origination facility 102 and used by a reception facility 132 to determine a relative offset in time between audio and video signals. At step 400 the VANC checksum inserter 120 receives a frame of video and audio data. At step 405 the VANC checksum inserter 120 selects the video and audio data for a scanline of the frame. At step 410 the VANC checksum inserter 120 generates characterization data for video signal of the frame by capturing the checksum for the video data corresponding to the scanline. At step 415 the VANC checksum inserter 120 generates characterization data for the audio signals of the frame by capturing the checksum for one or more channel pairs of the video data corresponding to the scanline.

At step 420 the frame construction unit 305 inserts the characterization data for the frame into the VANC space of a signal that includes the video and audio signals for the frame. The television origination facility 102 then transmits the constructed frame to a reception facility 132 that is configured to determine the relative offset in time between the audio and video signals for the sequence of frames using characterization data for each frame. The constructed frame also includes checksums for each scanline in the frame that are encoded outside of the VANC space of the signal. These per-scanline checksums are used to detect whether or not the frame data is corrupted when it is received by the reception facility.

Figure 4B:
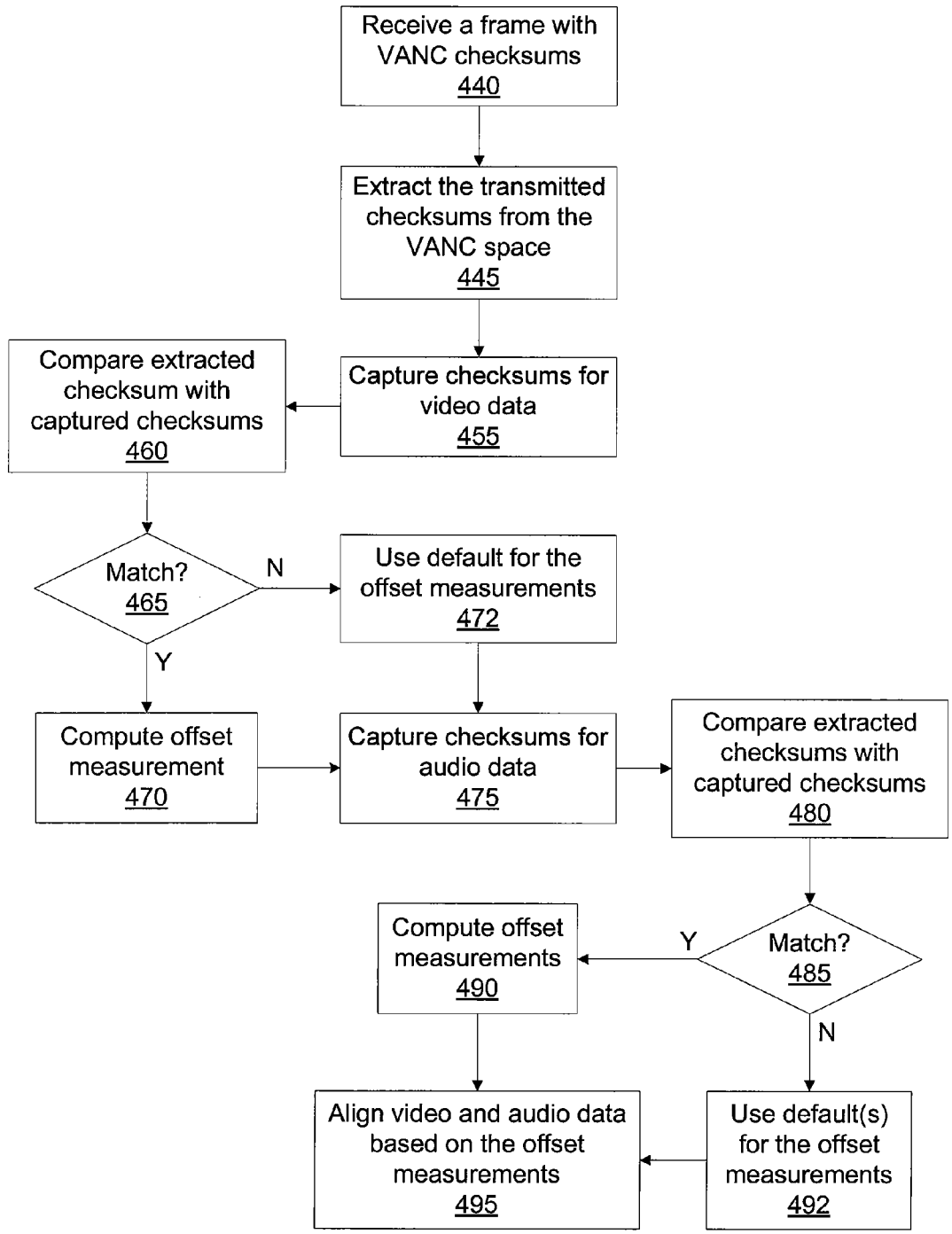
FIG. 4B is a flowchart of method steps describing the operation of the VANC data receiver of FIG. 3B, according to one embodiment of the invention.

FIG. 4B is a flowchart of method steps describing the operation of the VANC checksum receiver 150 of FIG. 3B, according to one embodiment of the invention. The VANC checksum receiver 150 is configured to characterize a relative offset in time between audio and video signals in a sequence of frames. At step 440 the VANC checksum receiver 150 receives a frame with VANC checksums and video and audio data from the television origination facility 102. At step 445 the transmitted characterization data, e.g., checksums that are included in the VANC space, are extracted from the frame.

At step 455 the scanline checksum capture unit 340 captures checksums for each scanline of video data in the frame, including the same scanline that was used by the television origination facility 102 to produce the VANC checksum. At step 460 the captured checksums for the video data are compared with the extracted checksum corresponding to video data for the frame. At step 465 the checksum comparison unit 350 determines if one of the captured checksums matches the extracted checksum for the video data. If a match is found at step 465, then at step 470 the offset measurement for the video data is computed and the method proceeds to step 475. Note, that in order to check if the video data for a frame is received before the corresponding checksum is received in the VANC, the captured checksums may be buffered for multiple frames and also compared with the newly extracted checksums by the checksum comparison unit 350.

If, at step 465 a match is not found, then at step 472 a default value is used for the offset measurement for the video data. For example, the offset measurement for the video data may be set to a default of zero. When no match is found and the timeout count has expired, the timeout unit 345 may indicate that the offset measurement for the video signal cannot be determined.

At step 475 the scanline checksum capture unit 340 captures per-scanline checksums for each audio channel pair in the frame, including the same scanline that was used by the television origination facility 102 to produce the VANC checksum. At step 480 the captured checksums for the audio data are compared with the extracted checksum corresponding to audio data for the sequence of frames. At step 485 the checksum comparison unit 350 determines if one of the captured checksums for an audio channel pair matches the corresponding extracted checksum for the audio channel pair. If a match is found for one or more of the audio channel pairs at step 485, then at step 490 the offset measurement for the matching audio data is computed and the method proceeds to step 495. Note, that in order to check if the audio data for a frame is received before the corresponding checksum is received in the VANC, the captured checksums may be buffered for multiple frames and also compared with the newly extracted checksums by the checksum comparison unit 350.

If at step 485, the checksum comparison unit 350 determines that none of the captured checksums for an audio channel pair matches the corresponding extracted checksum for the audio channel pair, then at step 492 a default value is used for the offset measurement. For example, the offset measurement for one or more audio pairs of the audio data may be set to a default of zero. When no match is found and the timeout count has expired, the timeout unit 345 may indicate that the offset measurement for the video signal cannot be determined.

At step 495 the audio and video data for the frame is aligned by combining buffered audio and/or video data from a previously received frame or scanlines in the sequence with the video or audio data from a later received frame or scanlines in the sequence to produce synchronized video and audio data. The audio and video data is aligned based on the offset measurements computed by the VANC checksum receiver 150.

One advantage of the systems and methods described herein is that, the characterization information is generated dynamically and transmitted by the television origination facility using in-band signaling, the television origination facility does not need to be out of service during the characterization of the relative offset in time between the video and audio signals. No additional communication channels are needed between the television origination facility and the reception facility since the reception facility is configured to extract the characterization data and determine the relative offsets in time between the video and audio signals using only the transmitted signals. Yet another advantage includes simpler and less expensive hardware, since the receiver only needs store a sequence of checksums extracted from and captured using the received signals and perform comparisons to calculate the relative offsets. The television origination facility generates and inserts captured checksums into the VANC space of each frame to provide the characterization data.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for characterizing a relative offset in time between audio and video signals, the method comprising:
    generating characterization data for synchronized audio and video signals associated with each frame in a sequence of frames;
    inserting the characterization data for the synchronized audio and video signals into a vertical ancillary (VANC) space of a signal that includes video and audio signals for each frame in the sequence of frames; and
    transmitting the signal to a receiver that is configured to reproduce the synchronized audio and video signals associated with each frame in the sequence of frames.

2. The method of claim 1, wherein the step of generating the characterization data comprises:
    capturing a checksum for the video signals associated with a first scanline for each frame in the sequence of frames; and
    capturing a checksum for the audio signals associated with the first scanline for each frame in the sequence of frames.

3. The method of claim 2, wherein the audio signals include a plurality of audio channels, wherein each audio channel is represented by an audio channel pair, and the step of capturing the checksum for the audio signals associated with the first scanline comprises capturing a separate checksum for each audio channel pair associated with the plurality of audio channels.

4. The method of claim 1, wherein the characterization data for each frame in the sequence of frames comprises:
    a checksum for the video signals associated with a first scanline; and
    a checksum for the audio signals associated with the first scanline.

5. The method of claim 4, wherein the audio signals includes a plurality audio channels, wherein each audio channel is represented by an audio channel pair, and the step of capturing the checksum for the audio signals associated with the first scanline comprises capturing a separate checksum for each audio channel pair associated with the plurality of audio channels.

6. The method of claim 4, wherein the characterization data for each frame in the sequence of frames comprises:
    an additional checksum for the video signals associated with an additional scanline; and
    an additional checksum for the audio signals associated with the additional scanline.

7. A system for characterizing a relative offset in time between audio and video signals, comprising:
    a video and audio source configured to:
        output synchronized video and audio signals associated with frames in a sequence of frames;
    a checksum inserter that is coupled to the video and audio source and configured to:
        generate characterization data for the synchronized audio and video signals associated with each frame in the sequence of frames;
        insert the characterization data for the synchronized audio and video signals into a vertical ancillary (VANC) space of a signal that includes video and audio signals for the frame in the sequence of frames; and
        transmit the signal to a receiver that is configured to reproduce the synchronized audio and video signals associated with each frame in the sequence of frames.

8. The system of claim 7, wherein the checksum inserter is further configured to generate the characterization data by:
    capturing a checksum for the video signals associated with a first scanline for each frame in the sequence of frames; and
    capturing a checksum for the audio signals associated with the first scanline for each frame in the sequence of frames.

9. The system of claim 8, wherein the audio signals include a plurality of audio channels, wherein each audio channel is represented by an audio channel pair, and the step of capturing the checksum for the audio signal associated with the first scanline comprises capturing a separate checksum for each audio channel pair associated with the plurality of audio channels.

10. The system of claim 7, wherein the characterization data for each frame in the sequence of frames comprises:
    a checksum for the video signals associated with a first scanline; and
    a checksum for the audio signals associated with the first scanline.

11. The system of claim 10, wherein the audio signals includes a plurality audio channels, wherein each audio channel is represented by an audio channel pair, and the step of capturing the checksum for the audio signal associated with the first scanline comprises capturing a separate checksum for each audio channel pair associated with the plurality of audio channels.

12. The system of claim 10, wherein the characterization data for each frame in the sequence of frames comprises:
    an additional checksum for the video signals associated with an additional scanline; and
    an additional checksum for the audio signals associated with the additional scanline.

13. A non-transitory computer-readable storage medium storing instructions that, when executed by a processor, cause a computer system to characterize a relative offset in time between audio and video signals, by performing the steps of:
    generating characterization data for synchronized audio and video signals associated with each frame in a sequence of frames;
    inserting the characterization data for the synchronized audio and video signals into a vertical ancillary (VANC) space of a signal that includes video and audio signals for each frame in the sequence of frames; and
    transmitting the signal to a receiver that is configured to reproduce the synchronized audio and video signals associated with each frame in the sequence of frames.

14. The non-transitory computer-readable storage medium of claim 13, wherein the step of generating the characterization data comprises:
    capturing a checksum for the video signals associated with a first scanline for each frame in the sequence of frames; and
    capturing a checksum for the audio signals associated with the first scanline for each frame in the sequence of frames.

15. The non-transitory computer-readable storage medium of claim 14, wherein the audio signals include a plurality of audio channels, wherein each audio channel is represented by an audio channel pair, and the step of capturing the checksum for the audio signals associated with the first scanline comprises capturing a separate checksum for each audio channel pair associated with the plurality of audio channels.

16. The non-transitory computer-readable storage medium of claim 13, wherein the characterization data for each frame in the sequence of frames comprises:
  a checksum for the video signals associated with a first scanline; and
  a checksum for the audio signals associated with the first scanline.

17. The non-transitory computer-readable storage medium of claim 16, wherein the audio signals includes a plurality audio channels, wherein each audio channel is represented by an audio channel pair, and the step of capturing the checksum for the audio signals associated with the first scanline comprises capturing a separate checksum for each audio channel pair associated with the plurality of audio channels.

18. The non-transitory computer-readable storage medium of claim 16, wherein the characterization data for each frame in the sequence of frames comprises:
  an additional checksum for the video signals associated with an additional scanline; and
  an additional checksum for the audio signals associated with the additional scanline.

* * * * *